(12) United States Patent
Etzel et al.

(10) Patent No.: US 6,357,732 B1
(45) Date of Patent: *Mar. 19, 2002

(54) RESILIENT MEMBER FOR RAILWAY VEHICLE SIDE BEARINGS

(75) Inventors: William G. Etzel, McKean; Troy P. Herbst, Erie; Philip A. Jones, North East, all of PA (US)

(73) Assignee: Lord Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,148

(22) Filed: Jan. 31, 2000

(51) Int. Cl.[7] .............................................. B60G 11/14
(52) U.S. Cl. ........................ 267/153; 267/141; 267/292; 267/293
(58) Field of Search ............................. 267/3, 292–294, 267/140, 141, 141.1, 141.2, 153; 213/32 C; 384/423, 117, 595, 599, 296; 105/167, 199.3, 218.1, 4.1, 198.7; 29/895.32, 985.3; 248/634

(56) References Cited

U.S. PATENT DOCUMENTS

| | | | |
|---|---|---|---|
| 2,207,848 A | 7/1940 | Barrows | 105/224.1 |
| 2,215,182 A | 9/1940 | Latshaw | 105/224.1 |
| 3,961,584 A | 6/1976 | Paton et al. | 105/182 R |
| 4,381,589 A | 5/1983 | Cope | 29/149.5 R |
| 6,224,047 B1 * | 5/2001 | Gwinn | 267/292 |

FOREIGN PATENT DOCUMENTS

| | | |
|---|---|---|
| EP | 0 873 928 A1 | 10/1998 |
| GB | 987239 | 3/1965 |
| GB | 2 210 136 A | 6/1989 |

* cited by examiner

Primary Examiner—Douglas C. Butler
(74) Attorney, Agent, or Firm—Michael M. Gnibus; James J. Bindseil

(57) ABSTRACT

An resilient member for a side bearing assembly includes a first rigid element extending in a linear direction and having a first end and a second end. A second rigid element extends in the linear direction of the first rigid element spaced from the first rigid element to provide a space between the two. The second element also has a first end. The first end of the second element is displaced along the linear direction away from the first end of the first rigid element. Resilient or elastomeric material fills the space between the first rigid element and the second rigid element with a substantially concave profile connecting the first ends of the two elements. The resilient material includes at least one weakened region along the substantially concave portion thereof as a result of assembly, which is located where the resilient material is subjected to the relatively lower stresses and strains when used in a side bearing assembly.

22 Claims, 8 Drawing Sheets

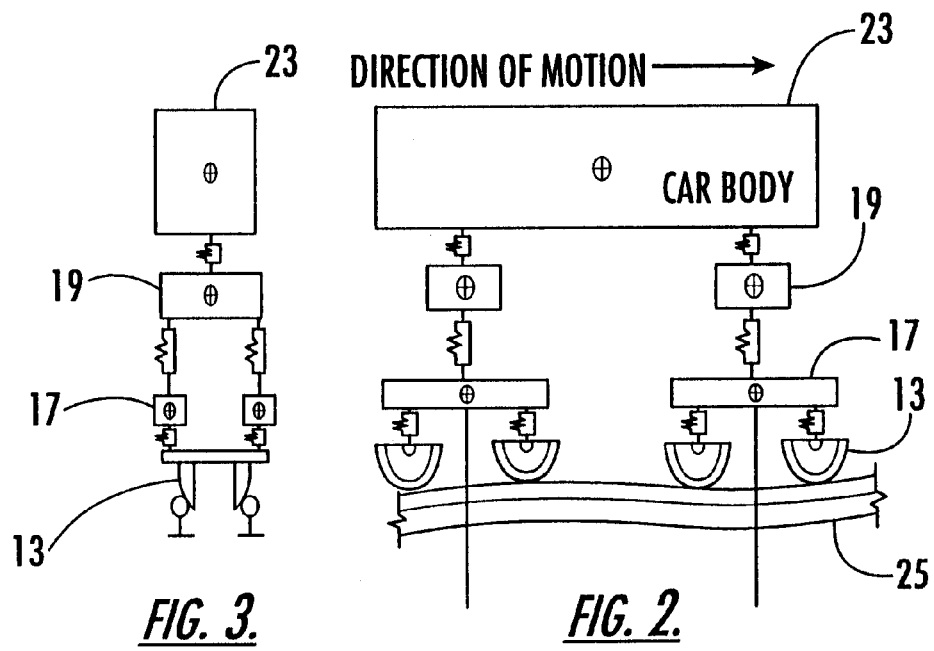
FIG. 3.  FIG. 2.
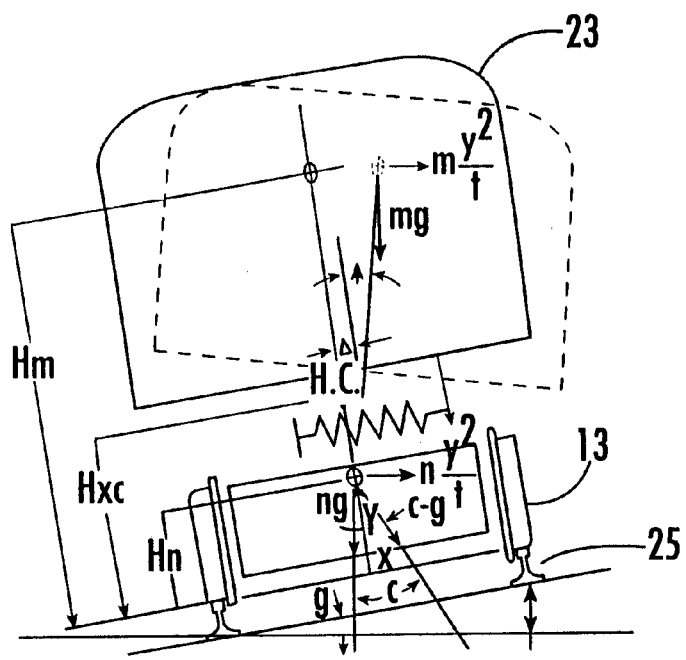
FIG. 4.

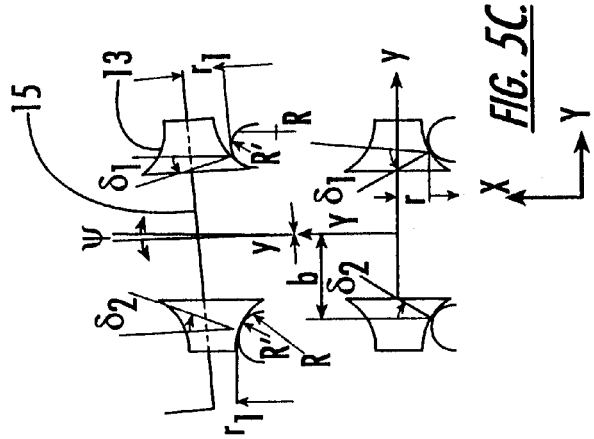
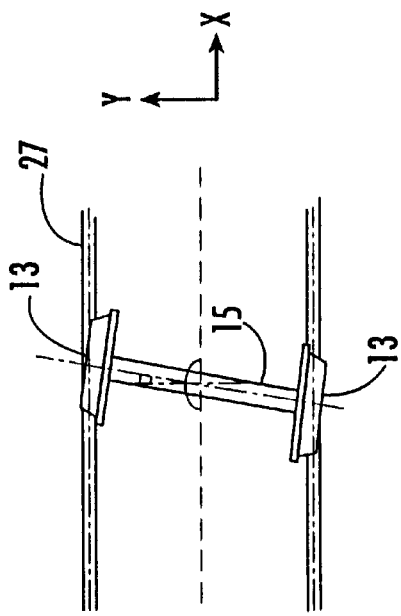
FIG. 5C.
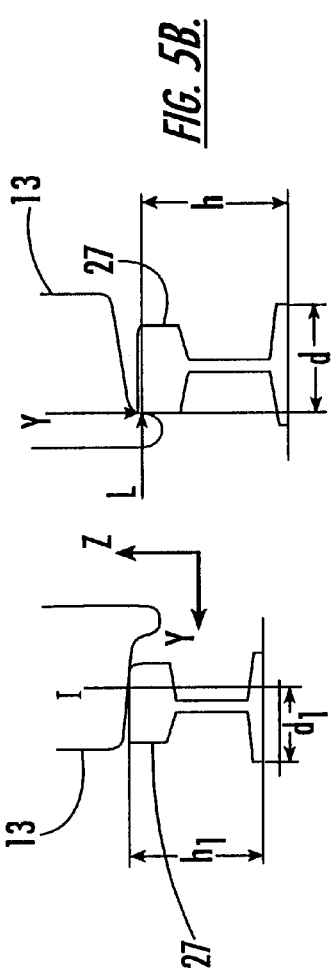
FIG. 5B.
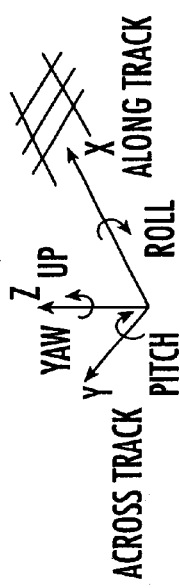
FIG. 5A.

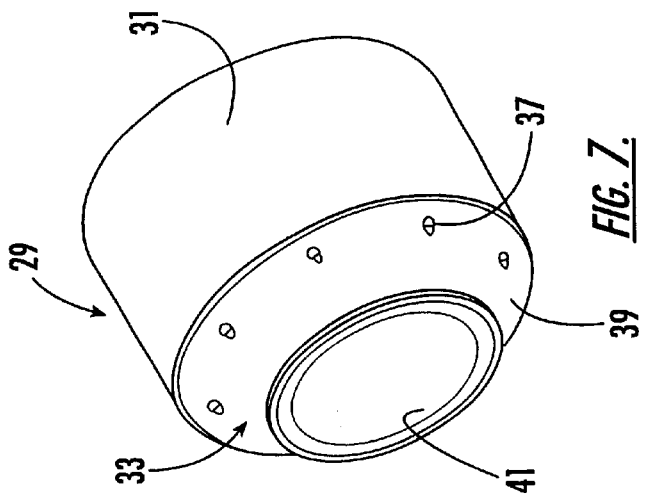
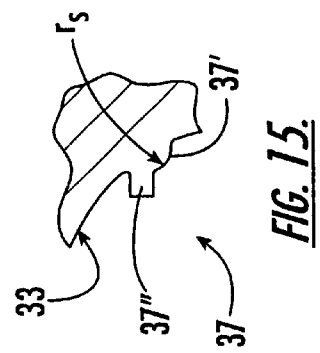
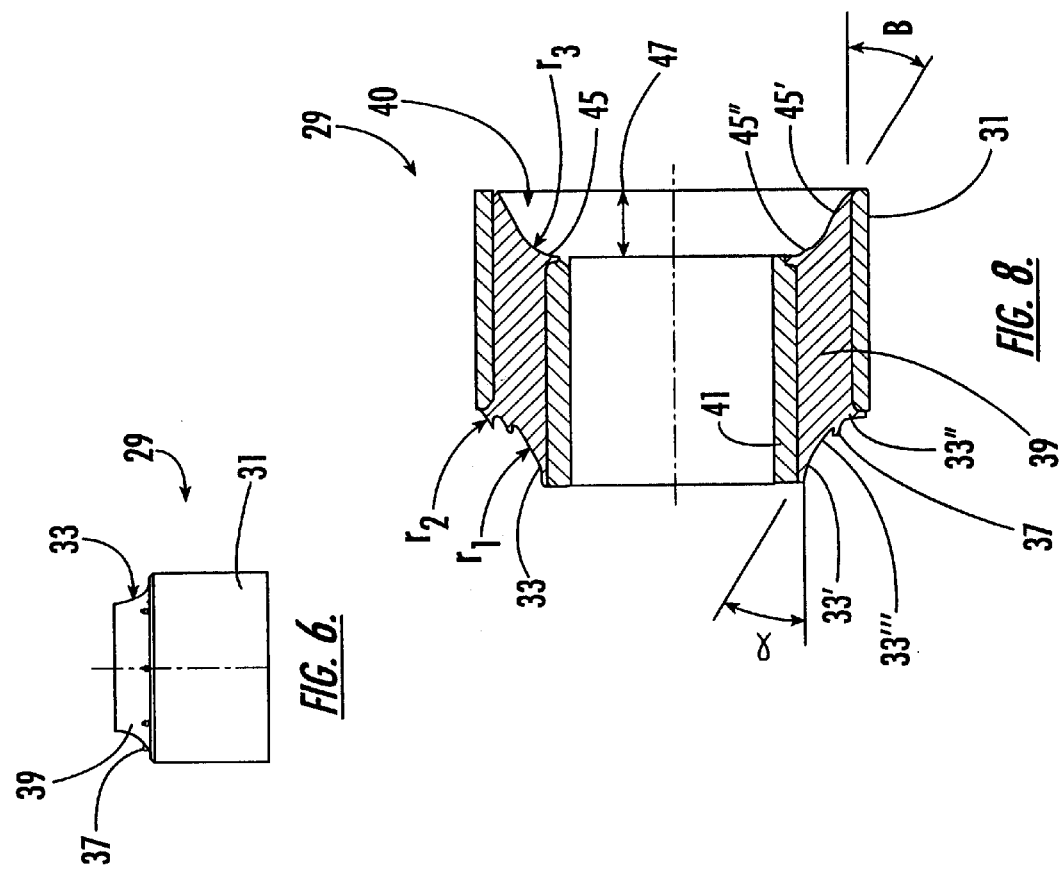

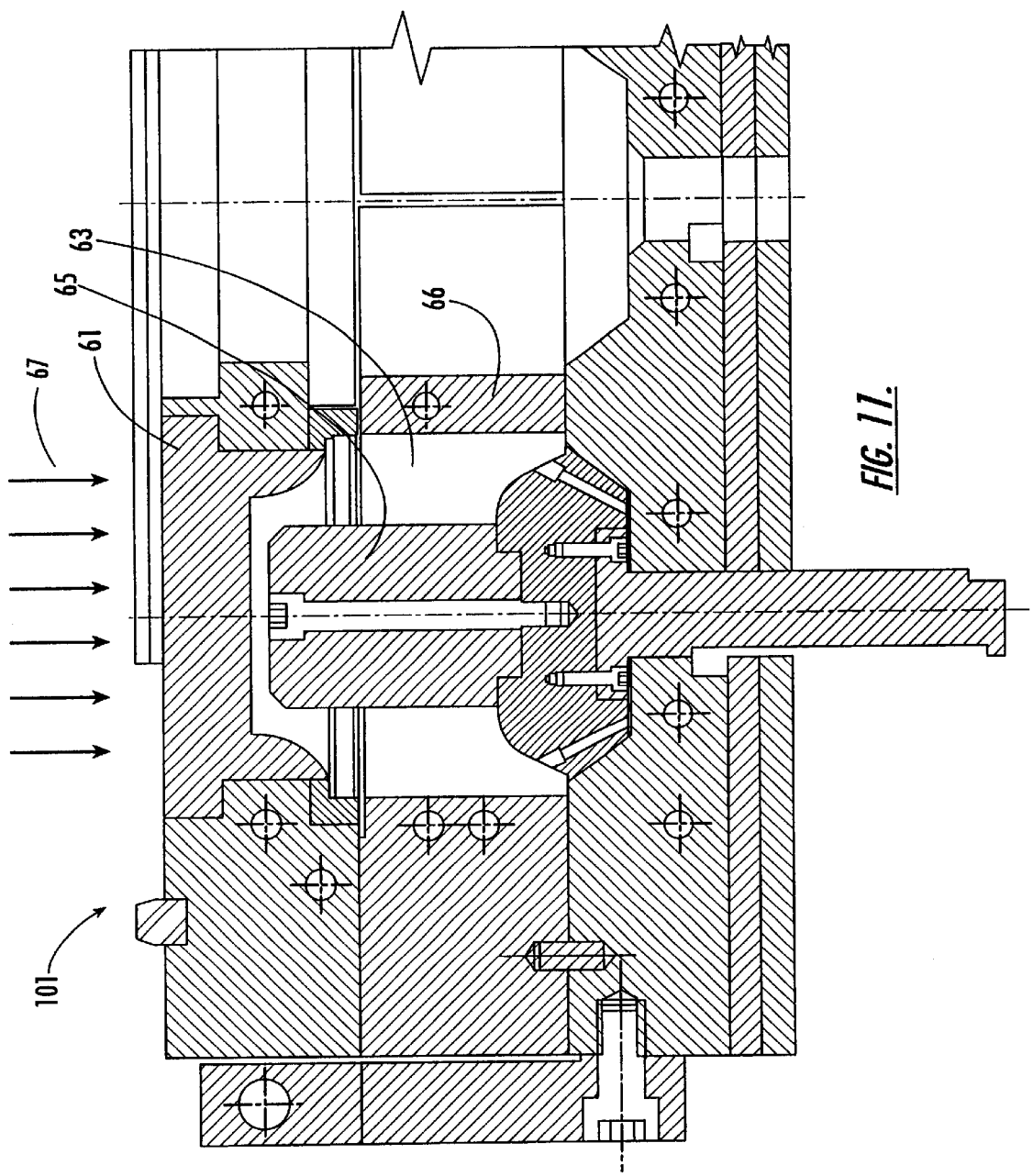

RESILIENT MEMBER FOR RAILWAY VEHICLE SIDE BEARINGS

FIELD OF THE INVENTION

This invention relates to a resilient member for use in side bearings, in particular, for side bearings deployed on railroad cars, typically freight cars. The invention also relates to a method of manufacturing the resilient members and the mold used in such manufacture.

BACKGROUND OF THE INVENTION

Side bearings used on railroad vehicles, in particular railroad freight trucks, have taken many different configurations. Typically, such side bearings are used to control truck dynamic motion to minimize dynamic instabilities at higher operating speeds. More specifically, as railroad trucks become lighter and travel at higher speeds, dynamic instability tendencies increase, and it becomes necessary that such truck side bearings control such increased tendencies. These dynamic instabilities typically are referred to in the railroad industry as "truck hunting."

More specifically, a railroad truck's hunting motion starts at the wheel/rail interface and is translated into the multi-body system of the railroad car. Thus, in order to minimize such hunting motion being translated into the multi-body system, side bearings are deployed as one of a multitude of suspension components, and serve multiple functions.

When mounted on a freight truck's suspension, side bearings provide damping as a result of friction between the side bearing and car body. Further, the radial stiffness of most side bearings provides a more controlled connection between the wheels and the multi-body system.

In order to provide the above functions, side bearings rely on resilient members which make up part of the side bearing assembly. Such resilient members come in many shapes and forms, and each has its advantages and disadvantages.

One method of manufacture of such resilient members is through a transfer molding-type operation. More specifically, in such an operation, typically a resilient or elastomeric material (used interchangeably herein), such as rubber compound, is introduced into a mold through sprues located in a cap for the mold. The rubber compound is introduced under pressurized conditions to fill the mold which also contains metal elements covered with adhesive such that the rubber compound bonds to the metal. The compound is allowed to cure, and the resultant resilient member is then removed from the mold.

In conducting this operation, it is usually the case that the resilient member is weaker at the locations adjacent to where the sprues are located due to the inhomogeneity of the rubber compound in the area of the incoming flow. If such weakened regions occur at portions of the resilient member which receive the greatest stresses, forces and/or strains, such as on outer surface areas, the resilient member will often fail and break prematurely. This is especially true under extensive dynamic loading, such as in a suspension system. Similarly, when the cap is removed from the mold, as a result of rubber compound remaining in the sprue, weakened areas are created in the resilient material as the rubber compound sometimes breaks off beyond the end of the sprue and into the working body of the resilient member, making the resilient member non-usable or susceptible to stress concentrations and premature failure.

Thus, in accordance with the invention, the problems of the prior art are avoided, and a resilient member is provided having a unique geometry which is substantially less susceptible to failure than the resilient members currently in use. Further, a method and mold are provided which maintain the simplicity of prior methods and mold assemblies.

SUMMARY OF THE INVENTION

In accordance with one aspect of the invention, there is provided a resilient member, typically for use as an insert in a railway vehicle side bearing assembly. Although one skilled in the art will realize many other applications of the resilient member of the present invention. The resilient member includes a first rigid element extending in a linear direction, and having a first end and a second end. A second rigid element is disposed spaced substantially parallel to the first rigid element to provide a space between the first rigid element and the second rigid element. The second rigid element extends in the linear direction of the first rigid element, and includes a first end, with at least the first end displaced or offset along the linear direction away from the first end of the first rigid element. Resilient or elastomeric material fills the space between the first rigid element and the second element and adheres to the two elements. The resilient material extends between the first end of the first rigid element and the first end of the second element to define a predetermined, preferably substantially concave, profile between the two first ends. The resilient material also includes at a predetermined location at least one weakened region along the profile thereof. The weakened region a result of the resilient material being assembled with the first rigid element and the second rigid element, and adjacent to sprue locations in a mold. The weakened region is at a predetermined location on the resilient material which is subject to the lowest stress/strains when the resilient member is used as an insert in a side bearing assembly.

In another aspect, the invention relates to a method of making a resilient member which is used as an insert in a side bearing assembly. The method includes placing a first and a second rigid element in a mold with the first and second rigid elements extending in a linear direction and spaced, typically substantially parallel, from each other. As a result, a space is defined between the two elements. As noted previously, the first and second rigid elements each have a first end and a second end, with the first end of the first rigid element offset from the first end of the second rigid element. The first and second rigid elements have side surfaces substantially parallel to each other and facing each other. An adhesive is applied on the side surfaces of the first and second rigid elements which face each other, and resilient material is then forced into the mold through a cap having a predetermined, preferably substantially concave, profile surface extending between the first ends of the two rigid elements. The cap includes sprues spaced from each other around the periphery of the cap, and adjacent to the first end of the second rigid member. The resilient material is forced through the sprues into the mold. The sprues are positioned at a predetermined location of the lowest stress/strain in the resilient material of the dynamically loaded resilient member, and in the closest proximity to the second rigid element which allows the resilient material to be forced into the mold without stripping the adhesive off the side surface of the second rigid element. The resilient material is then cured in the mold to rigidify and have it adhere to the first and second rigid elements to result in the resilient member.

In another aspect, the invention relates to the mold for forming the resilient member. The mold includes a cap having sprues spaced about the periphery of the cap which allows the mold body to be filled with resilient or elastomeric material forced through the sprues under pressure. The sprues are positioned at a predetermined location of the lowest stress/strain in the resilient material of the dynamically loaded resilient member, and in the closest proximity to a rigid element in the mold while not stripping adhesive from the wall of the rigid element. The rigid elements in the mold may be, for example, flat or cylindrical elements previously placed in the mold for the purpose of manufacturing the resilient member or mount of the invention.

BRIEF DESCRIPTION OF THE DRAWINGS

Having thus generally described the invention, the same will become better known from the following detailed discussion, made with reference to the appended drawings, wherein:

FIG. 2 is a schematic diagram showing a side view of the multi-body system of a freight car illustrating the types of motion, and resultant forces and strains to which a freight car suspension is subjected;

FIG. 3 is a schematic diagram showing an end view (front or back) of the multi-body system of FIG. 2;

FIG. 4 is a schematic diagram showing an end view (front or back) of a freight car illustrating body roll encountered by such freight cars;

FIGS. 5A, 5B and 5C generally illustrates, in various partial sectional views, how hunting motion starts at a freight car wheel/rail interface and is translated into the multi-body system of the freight car;

FIG. 6 is a side view of one embodiment of the resilient element;

FIG. 7 is a perspective view of the embodiment of FIG. 6 of the resilient element;

FIG. 8 is a cross-sectional view of the embodiment of FIG. 6 of the resilient element;

FIG. 11 is a side cross-sectional view of a mold for use in the manufacturing process for manufacturing the resilient element of FIG. 6;

FIG. 15 is an enlarged cross-sectional view of the sprue riser of FIG. 8.

DETAILED DISCUSSION OF THE INVENTION

Figure 1:
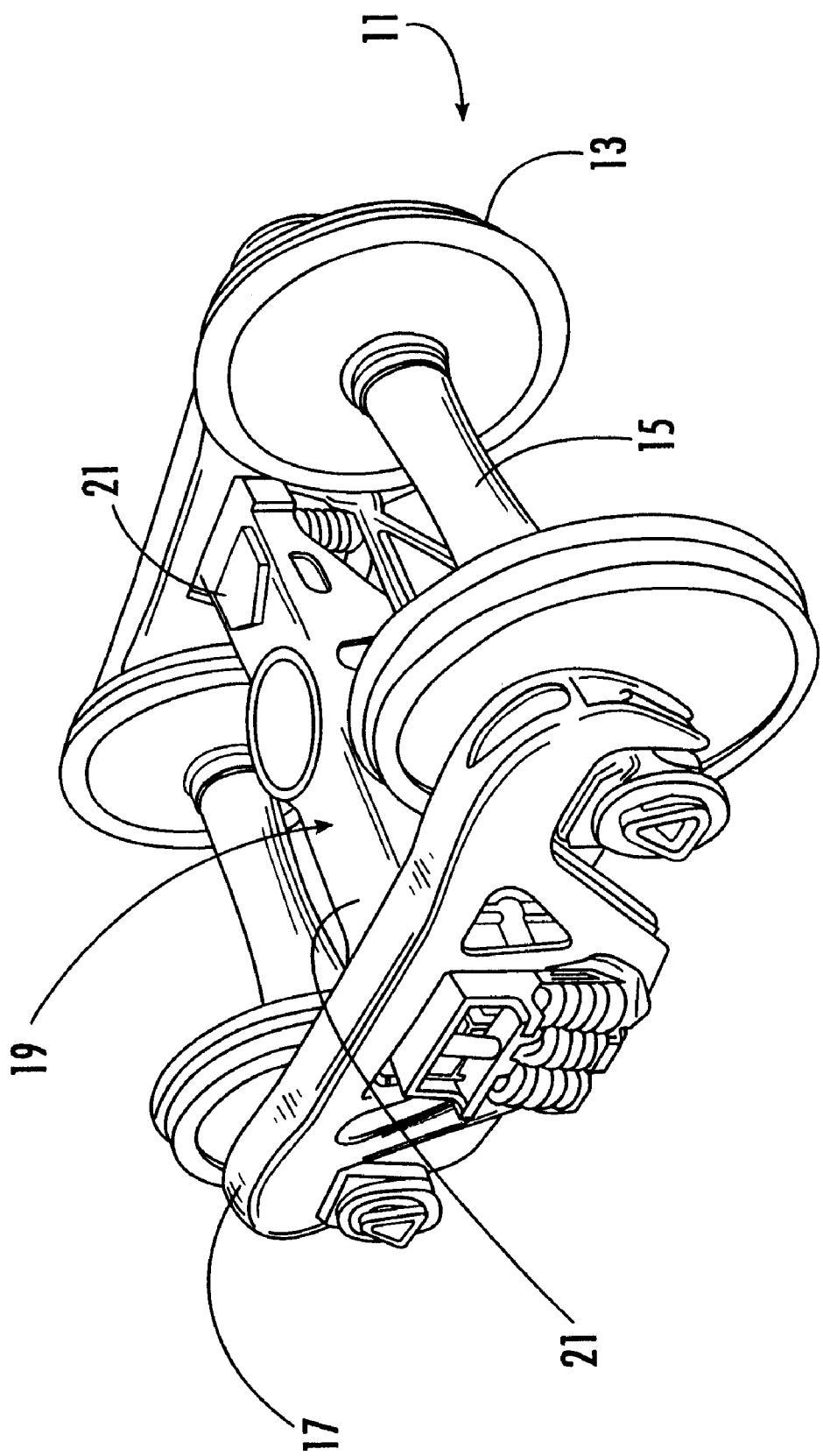
FIG. 1 is a perspective view of a three piece freight car truck of the type on which side bearings employing the resilient members are mounted.

FIG. 1 illustrates a freight car truck 11 of the type upon which the resilient member described herein is deployed. A typical freight car truck 11 includes wheels 13 connected by axles 15 supported by side frames 17 which are connected to each other through a bolster 19. The bolster 19 includes side bearing pads 21 upon which side bearings can be mounted.

Side bearings are generally necessary on the freight car trucks for railroad cars because they control hunting in railroad cars which result from lighter weights and higher speeds for modern day railroad cars. FIGS. 2–4 illustrate generally how freight car side bearings serve multiple functions. Specifically, in a multi-body system, a freight car is subject to a number of different forces due to, for example, the track 25 on which the railroad car travels having a generally rolling configuration as illustrated in FIG. 2. Similarly, body roll occurs due to track configuration such as shown in FIG. 4. The freight car side bearings serve multiple functions. More specifically, friction between the side bearings which are mounted on the bolster 19, and the car body 23 provides damping. Radial stiffness of the side bearings provides a more controlled connection between the bolster 19 and the car body 23. Further, the resilient member of the present invention provides long travel that more evenly distributes vertical and friction forces in curving, particularly during a broader range of vertical displacements. This is more clearly shown in FIG. 4.

FIG. 5 further illustrates how hunting motion starts at the wheel/rail interface and is translated into the multi-body system. For instance, FIG. 5a illustrates this tendency for connected wheels 13 rolling on a track having separate rails 27, for example, where the axle 15 is turned at an angle from the typical perpendicular position relative to the rails. FIG. 5b illustrates the geometry of rail rollover in such a circumstance, with the angular displacement $\psi$ of the one axle 15 relative to the track direction more clearly shown in FIG. 5c. This is a problem that is common on all railroad trucks and is readily apparent from FIG. 5 to those of ordinarily skill in the art.

Referring to FIGS. 6–8, one embodiment of a resilient member 29 for use in the side bearing. The resilient member 29 includes an outer rigid element or first sleeve 31, which is generally cylindrical in shape, radially spaced apart from an inner rigid element or second sleeve 41 (FIG. 8), which is generally concentric with the first sleeve. Resilient or elastic material 39 fills the space 40 (FIG. 8) between the spaced apart sleeves 31 and 41. At the ends of the resilient member 29, the resilient material 39 extends in a generally or substantially concave profile 33 and 45, as shown in FIG. 8, that serves to connect the ends of the first sleeve 31 to the respective ends of the second sleeve 41. The resilient member 29 is manufactured using a transfer process, as described hereafter, by transferring the resilient material 39 through sprues in a cap of a mold. The locations on the resilient material 39 corresponding to the locations of the sprues of the cap are generally shown as sprue risers or semi-spherical regions 37. The sprue risers 37 result in a weakened region of the resilient material 39 relative to the working body of the resilient material, due to the local effects of the incoming flow of resilient material. Further, because the sprue risers 37 create a substantial change in the contour of the profile 33, the sprue risers induce stress/strain concentrations. Therefore to avoid negatively affecting the flex life and performance of the resilient member 29, it is desirable to place the sprue risers 37 at a predetermined location of relatively low stress/strain along the profile 33. In this embodiment, the lowest stress/strain area of profile 33 is adjacent to outer sleeve 31. This lowest stress/strain area also coincides with a bulge area created by the displacement of the first sleeve 31 relative to the second sleeve 41 under static and dynamic loading. The "bulge area" is the area on the profile 33 that expands outwardly from the resilient material 39 as a result of shear or compression forces on the resilient material. Because the lowest stress/strain area of profile 33 is also adjacent to the inner wall of sleeve 31, the position of the sprue risers 37, and correspondingly the sprues for the mold, are selected to be as close to the inner wall of the sleeve 31 as possible. This location is selected such that when the resilient or elastomeric material is transferred under pressure through the sprues, adhesive, which has previously been placed on the inside walls of the sleeve 31, is not stripped off by the incoming flow of the resilient material from the sprue. Thus, the most preferable position for the sprues, corresponding to the position of the sprue risers 37, is the lowest stress/strain area along the profile 33, and also the closest position to the inner wall of the sleeve 31 which allows transfer of the elastomeric material without stripping the adhesive off the inner walls.

As can be seen from FIG. 8, the ends of the inner rigid cylindrical shaped element or second sleeve 41 are linearly offset relative to the corresponding ends of the outer rigid cylindrical element or sleeve 31 to define a linear deformation space 47. For example, a static or dynamic load applied to either the inner or out sleeve 31 or 41 causes a translation of the inner sleeve relative to the outer sleeve. The linear deformation space 47 defines the maximum relative linear displacement between the sleeves 31 and 41 if the resilient member 29 is supporting a structure that bridges the diameter of the outer sleeve. As one skilled in the art will realize, linear translation along the concentric axis of the inner and outer sleeve 31 and 41 may be greater than the linear deformation space 47 if the structure mating with the inner and outer sleeves does not limit their relative movement. Also, as one skilled in the art will realize, the static and dynamic loads applied to he resilient member 29 may cause compression and/or shear forces within resilient material 39, and such loads are not limited to pure linear loads.

Profiles 45 and 33 have been described as being substantially concave, but preferably include a combination of arcuate or radial sections and straight sections. For example, referring to FIG. 8, profile 33 includes first and second sections 33' and 33'' separated by a third section 33'''. First section 33' extends along a radial path, $r_1$, from the end of inner sleeve 41 to the third section 33''', which is a straight section defined by the angle $\alpha$. The second section 33'' extends from the third section 33''' along a radial path, $r_2$, to connect with the end of outer sleeve 31. The sprue risers 37 may be primarily located within the second section 33'', but may extend into the third section 33'''. In this embodiment, $r_1$ is preferably about equal to $r_2$. One skilled in the art will realize, however, that the values of $r_1$ and $r_2$ will depend on the given application environment. Further, profile 45 includes a first section 45' that extends from the end of outer sleeve 31 to the middle of space 40 as a straight line at a predetermined angle $\beta$. A second section 45'' joins the first section 45' and follows a radial path, $r_3$, to connect with inner sleeve 41. In this embodiment, the value of $r_3$ is about equal to that of $r_1$ and $r_2$. The lengths and values of $r_1$, $r_2$ and $r_3$ and the values of $\alpha$ and $\beta$ are chosen so that the highest stress/strain areas within the resilient material 39, resulting from loading the resilient member 29, occur toward the center of the resilient material and away from the bond interface between the resilient material and the sleeves 31 and 41. Thus, profiles 33 and 45 may include radial or arcuate sections, straight sections, or combinations of both to reduce the stress and strain concentrations along the profile in the area where the sprue risers 37 are located.

Referring to FIG. 15, the sprue risers 37 have a predetermined geometry, generally including a semi-spherical projection extending from profile 33 of the resilient material 39 and integral with the working body of the resilient material. The sprue riser 37 has a spherical body 37', having a radius $r_s$, and a cylindrical member 37'' projecting from the spherical body. The cylindrical member 37'' generally extends in the same linear direction of the sleeves 31 and 41. However, the orientation of the cylindrical member 37'' is a function of the sprues in the mold, as will be discussed below. The predetermined geometry of the sprue riser 37 is chosen such that the body 37' is of a size to contain a substantial amount of the weakened or inhomogeneous area of the resilient material 39 caused by the flow discontinuities adjacent to the sprue. Further, the predetermined geometry of the sprue riser 37 is preferably a rounded or spherical contour so as to reduce stress/stain concentrations. Additionally, the predetermined geometry of the sprue riser 37 is preferably limited in overall size so as not to interfere with mating structures during deflection of the resilient member 29, which would result in induced stress/strain concentrations and premature failure.

Figure 10:
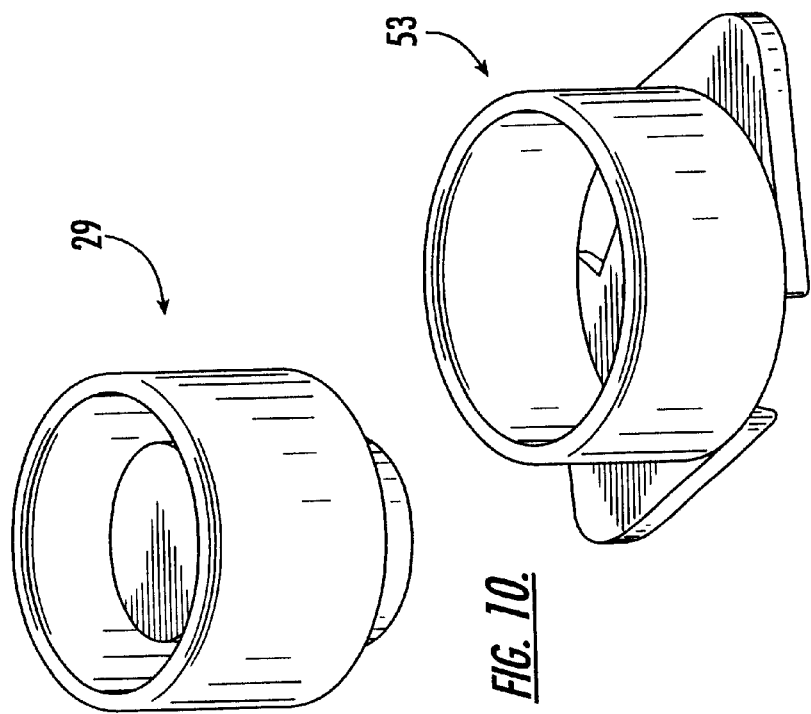
FIG. 10 is a perspective exploded view of the resilient element of FIG. 6 and a cage of a side bearing for housing the resilient element.
Figure 9:
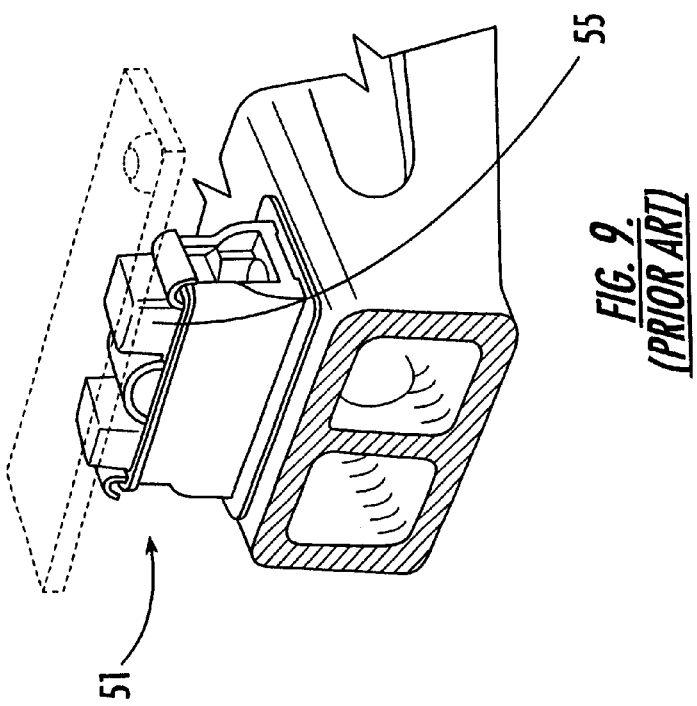
FIG. 9 is a perspective view of a typical prior art side bearing assembly.

With respect to how the resilient member is deployed in a side bearing, FIG. 9 illustrates a typical prior art side bearing 51. Conventional resilient members 55 are shown deployed in the conventional side bearing 51. Resilient member 29 may be used to replace a conventional side bearing 51 in a retrofit application, thereby providing improved suspension characteristics by minimizing dynamic instabilities. For example, FIG. 10 illustrates a cage 53 in which the resilient member 29 can be received to be deployed in a manner as shown for the conventional resilient members 55 in FIG. 9. As may be appreciated from FIG. 6, the resilient member 29 is placed in the cage 53 in a upside-down position compared to that shown in FIG. 6. The load direction on the resilient member 29 is shown by an arrow as shown in FIG. 6. When a load is placed on the resilient member 29 bulge occurs, as will be readily apparent to those skilled in the art of resilient members. In this embodiment, one of the bulge areas is also in or around the proximity of the region containing the lowest relative stresses and strains at the outer profile 33 of the resilient material 39.

FIG. 11 illustrates in side cross-sectional view a mold 101 having a cavity 63 used to manufacture the resilient member 29 of the invention. As may be appreciated, the two concentric sleeves 31 and 41 (not shown) are placed within the mold cavity. The inner sleeve 41 is supported within the mold 101 and is held concentrically around central projection 65. The outer sleeve 31 is received in contact with the outer walls of the cavity 63, defined by the mold base 66. Pressurized elastomeric material 67 is passed through sprues in a cap 61 for the mold 101 to be received within cavity 63 of the mold.

Figure 12:
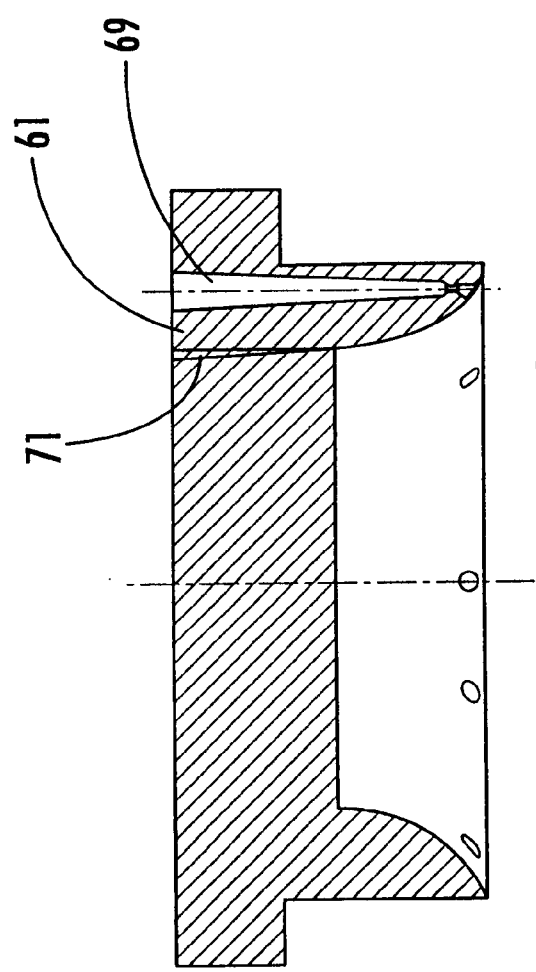
FIG. 12 is a side cross-sectional view of the cap of the mold of FIG. 11, illustrating the arrangement of sprue and vents thereof.

FIG. 12 further illustrates the cap 61 as having sprues 69 and vents 71. The sprues 69 are located as far outward from the center of the cap 61 as possible, where the resilient material 39 experiences the lowest stresses in the loading of the resilient member 29, and to be close to the inner wall of the outer sleeve 31 (not shown) without stripping off the adhesive coating, as discussed above. More specifically, in manufacturing the resilient member 29, adhesive is first placed on the inside wall surfaces of sleeve 31 and on the outside wall surfaces of sleeve 41. Because of the desire to locate the sprue risers 37 at the point of lowest stress and strain, which in this embodiment are positioned to be adjacent to the outer sleeve 31, it is required that the sprues 69 be located as close as possible to the inner wall of the sleeve 31, but not so close as to remove or strip off the adhesive when elastomeric material 67 is forced under pressure into the mold 101.

Figure 13:
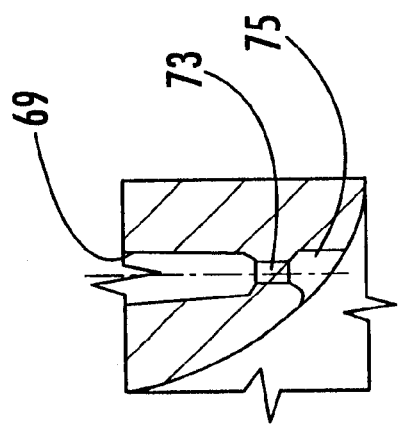
FIG. 13 is an enlarged partial view of the cap of FIG. 12 illustrating a sprue in greater detail.

As may be appreciated from FIG. 12, the cap 61 includes sprues 69 which taper downwardly to be narrower at the bottom than at the top. FIG. 13 illustrates a section 73 of the sprue, corresponding to the cylindrical member 37" of the sprue riser 37, which is substantially of the same diameter throughout and narrower than the main portion of the sprue 69. Section 73 opens into an enlarged dome region 75. The purpose of the narrow section 73 and dome region 75 is to allow the sprue risers or semi-spherical regions 37 to form and to create a separation plane within narrow section 73 when the cap 61 is removed, thereby breaking off the resilient material in the resilient member from material still remaining in the sprue 69. Limiting the material separation plane to section 73 insures that no breakage occurs in the working body portion of the resilient material 39 of the resilient member 29. Further, by localizing the separation plane within section 73, any rough surfaces at the separation plane that may cause stress and strain concentrations are kept as far away as possible from the working body of the resilient material 39. Vents 71 are placed at a location close to the top of the inside portion of the cap 61, which defines the profile 33 of the member 29, so as to allow material to move upward within the cap portion of the mold, and above the location of the sprue openings.

In manufacturing the resilient member 29 of the invention, the sleeves 31 and 41 are placed within the mold, adhesive is coated on to the exposed outer surface of sleeve 41 and the exposed inner surface of sleeve 31. The sleeves 31 and 41 are then preheated for a period of about 20 minutes at a temperature of about 325 degrees Fahrenheit. As one skilled in the art will realize, however, the time period and temperature may vary depending on the type of resilient material, the type of adhesive, and the size and thickness of the resilient member. Typically the adhesive employed is of the type commercially available from Lord Corporation under the designation of Lord 810 Adhesive. Of course, the adhesive selection will be readily apparent to those of ordinary skill in the art, and other equivalent adhesives can be used in place of the noted composition.

After preheating the mold and the sleeves 31 and 41, an elastomeric material 67 is forced through the sprues to fill the mold. Typically, such an elastomeric material is a rubber compound, for example, such as that commercially available from Lord Corporation under the designation Lord A-135SH. Although one skilled in the art will realize that other elastic materials may be utilized, such as natural rubber, synthetic elastomers and blends thereof. The sleeves can be metal, typically carbon steel. Other appropriate metals may be used as will be apparent to those of ordinary skill in the art.

Figure 14:
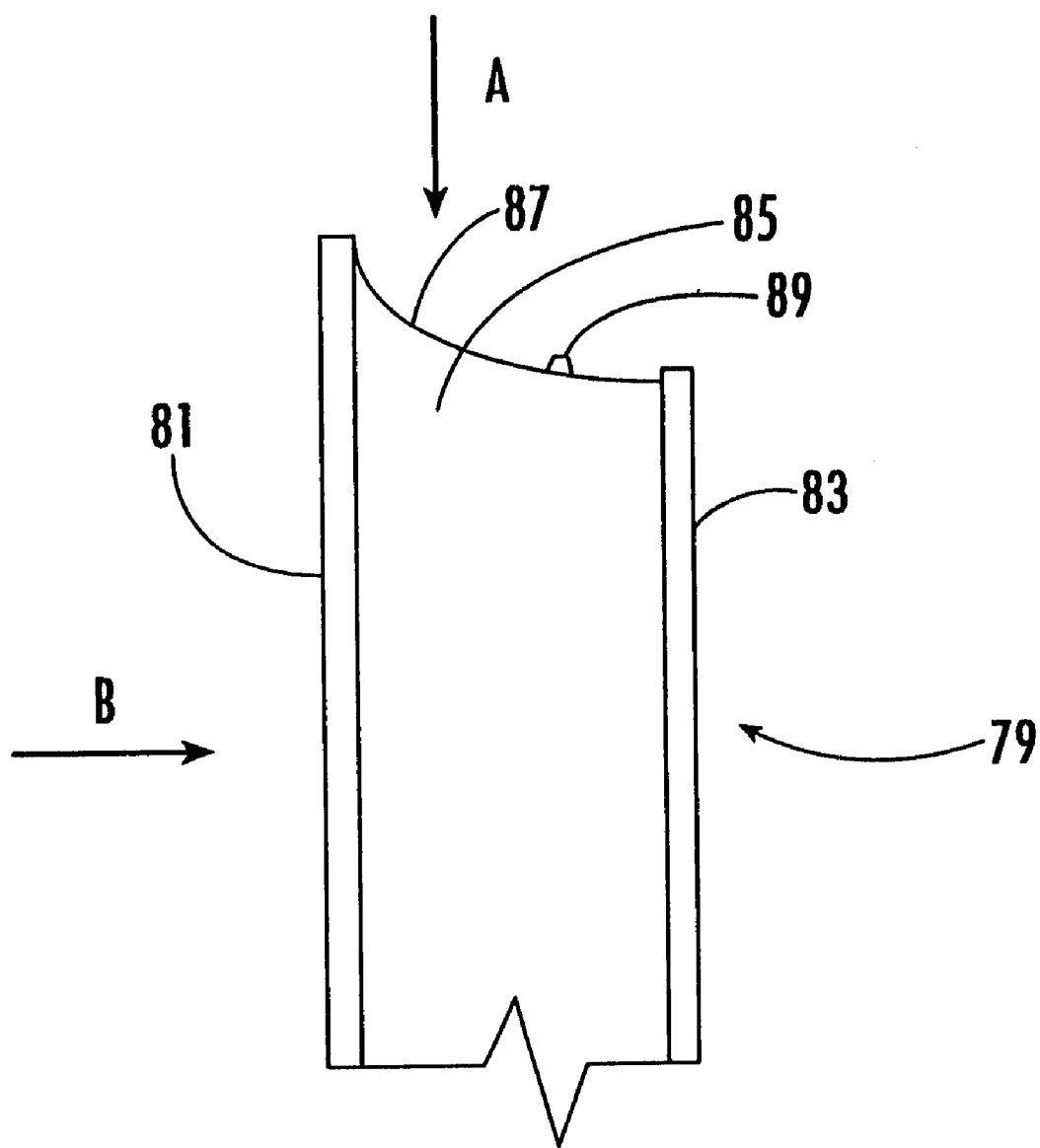
FIG. 14 is a side view of an alternative embodiment of the resilient element.

FIG. 14 illustrates a different type of mount or bearing 79 which can be manufactured in accordance with the invention. In this case two plates 81 and 83, for example, rectangular in shape, include a flat pad of resilient or elastomeric material 85 connecting the offset ends of the two plates. The mount 75 when deployed on a railroad car is positioned to have the plates extend horizontally so that the load on the mount is in the direction of arrow B, which is substantially perpendicular to the plane of the plates. Although, as one skilled in the art will realize, the mount may be utilized in other applications where the load is applied to one or both plates in a direction A, substantially parallel to the plane of the plates.

As with the prior embodiment, the mount 79 is made through a transfer process. In this case, the plates 81 and 83 preferably would be arranged vertically in a mold. A cap for the mold has an inner surface profile matching the profile 87 of the resilient material 85 and the sprues for the cap, corresponding to sprue risers 89, are located at the lowest stressed and strained area of the profile under a dynamic and/or static load. In all other aspects the materials and methods of manufacture are the same as for the prior embodiment, and the weakened regions of the resilient material, corresponding to the sprue risers 89, are positioned at the predetermined location of lowest stress/strain in the resilient material profile 87.

Having thus described the invention, the same will become better understood from the appended claims in which it is set forth in a non-limiting manner.

What is claimed is:

1. A resilient member, comprising:
   a first rigid element extending in a linear direction, and having a first end and a second end;
   a second rigid element extending in the linear direction of said first rigid element spaced apart from said first rigid element to provide a space between the first rigid element and the second rigid element, the second rigid element having a first end and a second end, and having at least the first end thereof displaced along the linear direction away from the first end of the first rigid element; and
   resilient material filling the space between the first rigid element and the second element, and extending between the first end of the first rigid element and the first end of the second element to define a substantially concave profile between the first end of the first rigid element and the first end of the second rigid element, and the resilient material having at least one weakened region along the concave portion thereof as a result of being assembled with said first rigid element and said second rigid element, with said at least one weakened region being at a location on said resilient material subject to the lowest stresses and strains when the resilient member is used as an insert in a suspension assembly.

2. The resilient member of claim 1, wherein the substantially concave profile further comprises a first radius and a second radius.

3. The resilient member of claim 2, wherein the first radius extends from about the first rigid member to about the weakened region, and wherein the second radius extends from about the weakened region to about the second rigid member.

4. The resilient member of claim 1, wherein the predetermined profile comprises a substantially linear portion and at least one curved portion.

5. The resilient member of claim 1, wherein the predetermined geometry of the weakened region comprises a portion of a sphere extending from a working area of the resilient material.

6. The resilient member of claim 5, wherein the predetermined geometry of the weakened region further comprises a cylindrical member extending from the portion of the sphere.

7. The resilient member of claim 1, wherein the first rigid member and the second rigid member are both planar members.

8. The resilient member of claim 1, wherein the first rigid member and the second rigid member are cylindrical members.

9. The resilient member of claim 1, wherein the resilient material is bonded to each of the first rigid member and the second rigid member.

10. The resilient member of claim 9, wherein the resilient material is a natural rubber compound.

11. A resilient member for a suspension system, comprising:
- a first rigid element, extending in a linear direction, having a first end and a second end;
- a second rigid element, extending in the linear direction of the first rigid element, spaced apart from the first rigid element to provide a space between the first rigid element and the second rigid element, the second rigid element having a first end and a second end, and having at least the first end thereof displaced along the linear direction away from the first end of the first rigid element;
- resilient material filling the space between the first rigid element and the second rigid element to define a working area, and extending between the first end of the first rigid element and the first end of the second rigid element to define a predetermined profile there between; and
- at least one sprue riser having a predetermined geometry and formed integrally with the resilient material externally of the working area and positioned at a predetermined location on the predetermined profile, the predetermined location being an area of relatively low stress and strain in the predetermined profile when the resilient material is loaded by movement of the first rigid member relative to the second rigid member.

12. The resilient member of claim 11 wherein the sprue riser is located adjacent to a bulge area of the resilient material and has a predetermined geometry.

13. The resilient member of claim 11, wherein the predetermined profile is substantially concave.

14. The resilient member of claim 13, wherein the concave profile further comprises a first radial section, a straight section and a second radial section.

15. The resilient member of claim 14, wherein the first radial section extends from about the first rigid member to about the sprue riser, and wherein the second radial section extends from about the sprue riser to about the second rigid member.

16. The resilient member of claim 11, wherein the predetermined profile comprises a linear portion and at least one curved portion.

17. The resilient member of claim 11, wherein the predetermined geometry of the sprue riser comprises a portion of a sphere extending from the working area.

18. The resilient member of claim 17, wherein the predetermined geometry of the sprue riser further comprises a cylindrical member extending from the portion of the sphere.

19. The resilient member of claim 11, wherein the first rigid member and the second rigid member are both planar members.

20. The resilient member of claim 11, wherein the first rigid member and the second rigid member are cylindrical members.

21. The resilient member of claim 11, wherein the resilient material is bonded to each of the first rigid member and the second rigid member.

22. The resilient member of claim 11 wherein the resilient material is a natural rubber compound.

* * * * *